(12) United States Patent
Lamport et al.

(10) Patent No.: US 12,364,987 B2
(45) Date of Patent: Jul. 22, 2025

(54) FLOW CELL FOR USE IN A FLUID MANAGEMENT AND/OR PROCESSING SYSTEM

(71) Applicant: CYTIVA US LLC, Marlborough, MA (US)

(72) Inventors: Kevin A. Lamport, Portsmouth (GB); Natasha J. Kelly, Portsmouth (GB)

(73) Assignee: CYTIVA US LLC

( * ) Notice: Subject to any disclaimer, the term of this patent is extended or adjusted under 35 U.S.C. 154(b) by 633 days.

(21) Appl. No.: 17/230,264

(22) Filed: Apr. 14, 2021

(65) Prior Publication Data
US 2021/0325212 A1  Oct. 21, 2021

(30) Foreign Application Priority Data

Apr. 17, 2020  (EP) .................................... 20 170 154

(51) Int. Cl.
*B01L 3/00* (2006.01)
*B01F 25/431* (2022.01)
(Continued)

(52) U.S. Cl.
CPC .......... *B01L 3/563* (2013.01); *B01F 25/4316* (2022.01); *G01D 11/30* (2013.01);
(Continued)

(58) Field of Classification Search
CPC .................................................... G01D 11/30
(Continued)

(56) References Cited

U.S. PATENT DOCUMENTS 4,706,503 A  11/1987  Kamentser
7,225,685 B2  6/2007  Kawamoto et al.
(Continued)

FOREIGN PATENT DOCUMENTS

CN  1920366 A  2/2007
CN  102656446 A  9/2012
(Continued)

OTHER PUBLICATIONS

European Patent Office, extended European Search Report in counterpart European Patent Application No. 20170154.7 mailed on Oct. 7, 2020.
(Continued)

*Primary Examiner* — Walter L Lindsay, Jr.
*Assistant Examiner* — Philip T Fadul
(74) *Attorney, Agent, or Firm* — Leydig, Voit & Mayer, Ltd.

(57) ABSTRACT

A flow cell for use in a fluid management and/or processing system is disclosed, said flow cell comprising a body having an inlet and an outlet and a fluid flow channel extending from the inlet to the outlet. Said body further comprises a receptacle comprising a chamber forming a part of the fluid flow channel, said chamber comprising a first opening for connecting a functional element to the flow cell such that the functional element is in contact with or exposed to a fluid flow passing through the fluid flow channel. A first tubular connector is arranged adjacent to the inlet. A second tubular connector is arranged adjacent to the outlet. The flow cell further comprises a functional element and a fluid flow path extending from the first tubular connector through the inlet, the body, the receptacle, and the outlet, to the second tubular connector.

26 Claims, 9 Drawing Sheets

(51) Int. Cl.
*G01D 11/30* (2006.01)
*F16L 41/02* (2006.01)
*F16L 43/00* (2006.01)

(52) U.S. Cl.
CPC ......... *B01F 25/4317* (2022.01); *F16L 41/021* (2013.01); *F16L 43/00* (2013.01)

(58) Field of Classification Search
USPC ....................................... 73/866.5
See application file for complete search history.

(56) References Cited

U.S. PATENT DOCUMENTS

| | | | |
|---|---|---|---|
| 7,373,825 | B2 | 5/2008 | Fennington, Jr. |
| 7,861,608 | B2 | 1/2011 | Furey et al. |
| 8,491,184 | B2 | 7/2013 | Kamen et al. |
| 8,817,259 | B2 | 8/2014 | Schick et al. |
| 9,035,661 | B2 | 5/2015 | Andersson et al. |
| 9,279,746 | B2 | 3/2016 | Wynn |
| 9,874,301 | B2 | 1/2018 | Eisner et al. |
| 10,001,454 | B2 | 6/2018 | Schick et al. |
| 10,215,597 | B2 | 2/2019 | Gagne et al. |
| 10,502,650 | B2 | 12/2019 | Gagne et al. |
| 10,557,739 | B2 | 2/2020 | Gagne et al. |
| 2011/0146425 | A1 | 6/2011 | Furey et al. |
| 2012/0119101 | A1 | 5/2012 | Wynn |
| 2012/0256641 | A1* | 10/2012 | Andersson ............ G01N 27/07 324/649 |
| 2013/0036800 | A1 | 2/2013 | Mohajer |
| 2015/0323486 | A1* | 11/2015 | Schick ............... G01N 27/4167 204/403.02 |
| 2016/0245714 | A1 | 8/2016 | Gagne et al. |
| 2020/0003590 | A1 | 1/2020 | Gagne et al. |
| 2020/0009557 | A1* | 1/2020 | Frigard ............. B01L 3/502738 |
| 2021/0299661 | A1* | 9/2021 | Lin ..................... G01M 3/26 |

FOREIGN PATENT DOCUMENTS

| | | |
|---|---|---|
| CN | 104981809 A | 10/2015 |
| CN | 106233119 A | 12/2016 |
| CN | 209707502 | 11/2019 |
| EP | 3 136 062 A1 | 3/2017 |
| JP | 2000-193529 A | 7/2000 |
| JP | 2000-292390 A | 10/2000 |
| JP | 2002-22691 A | 1/2002 |
| JP | 2007-056975 A | 3/2007 |
| JP | 2014-52054 4 | 3/2014 |
| JP | 2020-508673 A | 3/2020 |
| WO | WO 2005/045422 A1 | 5/2005 |
| WO | 2015/109209 A2 | 7/2015 |
| WO | WO 2016/100396 A1 | 6/2016 |
| WO | WO-2020243404 A1 * | 12/2020 ........ B01L 3/502715 |

OTHER PUBLICATIONS

Endress Hauser: "Dipfit CPA240 Flow assembly for pH or ORP sensors", retrieved from the Internet: URL: https://portal.endress.com/wa001/dla/5000319/0427/000/01/TI00179CEN_1319.pdf, Feb. 28, 2019, pp. 1-12.

Endress Hauser: "Operating Instructions CYA251 Flow assembly for nitrate/SAC, turbidity and oxygen sensors", retrieved from the Internet: URL: https://portal.endress.com/wa001/dla/5000491/1479/000/02/BA00495CEN_0318.pdf, Jan. 15, 2019, pp. 1-36.

Emerson: "Installation & Calibration Equipment Sensor & Instrument Mounting, Accessories, Systems and More", retrieved from the Internet: URL: https://www.emerson.com/documents/automation/flyer-installation-calibration-equipment-rosemount-en-71662.pdf, Dec. 31, 2012, pp. 1-48.

Chinese National Intellectual Property Administration, Office Action issued in counterpart Chinese Patent Application No. 202110391863.6, mailed on Aug. 30, 2023.

Chinese National Intellectual Property Administration, Office Action issued in counterpart Chinese Patent Application No. 202110391863.6, mailed on Jun. 22, 2024.

Allegro MVP Single-use System, 2013, http://ptj.jiho.jp/sites/default/files/30003/pdfdocs/USD2881_Allegro%20MVP%20Systam.pdf, Search data: Dec. 20, 2024.

Allegro Single-Use Tangent Flow Filtration System, 2011, http://g-eitan.com/pdf/Biotechnology/Ultrafiltration%20-%20TFF/Single%20use%20cross%20flow%20ststem/SingleUseTFF.pdf, Search data: Dec. 20. 2024.

Japanese Patent Office: Notice of Reasons for Rejection issued in counterpart Japanese Patent Application No. 2021-043851, mailed Jan. 21, 2025.

* cited by examiner

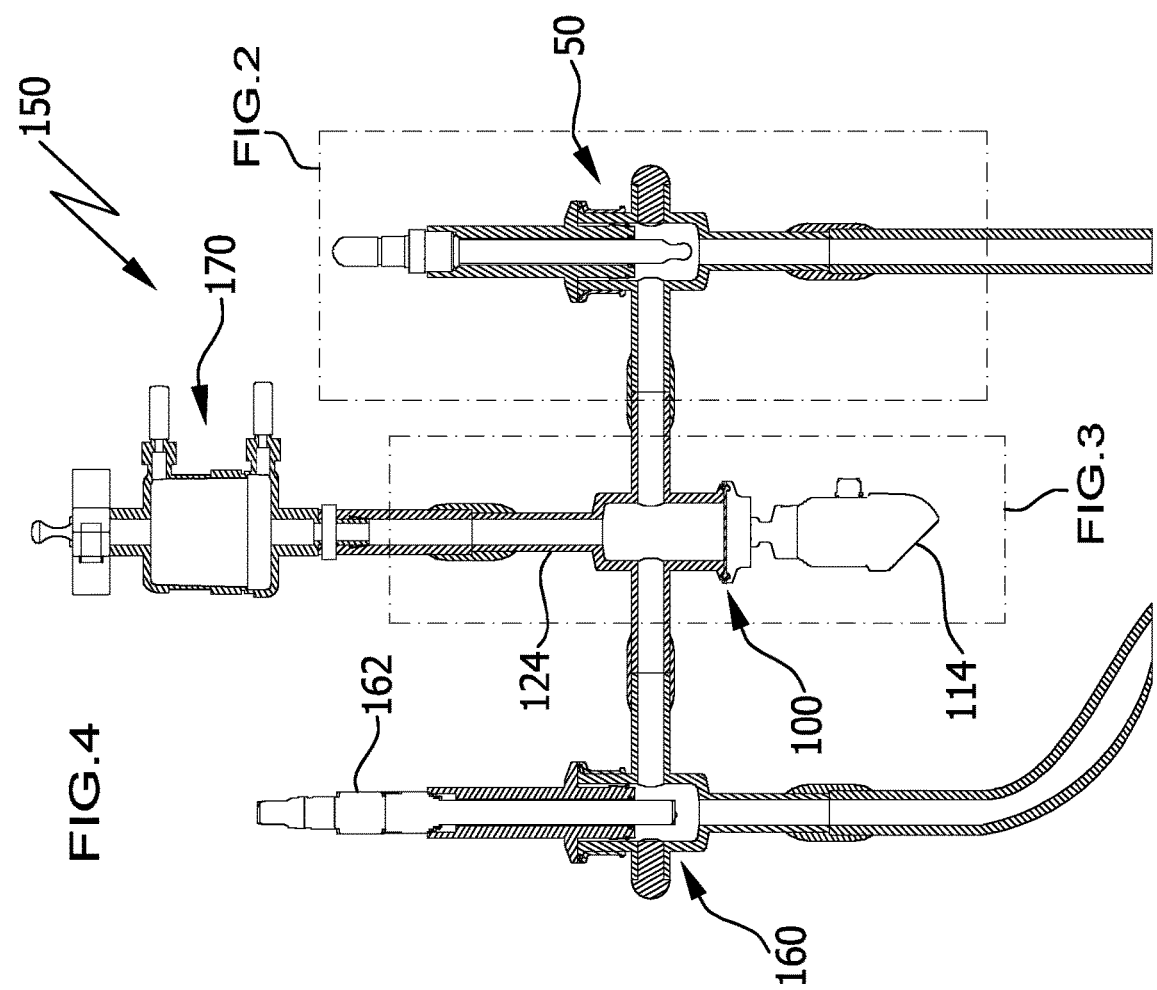
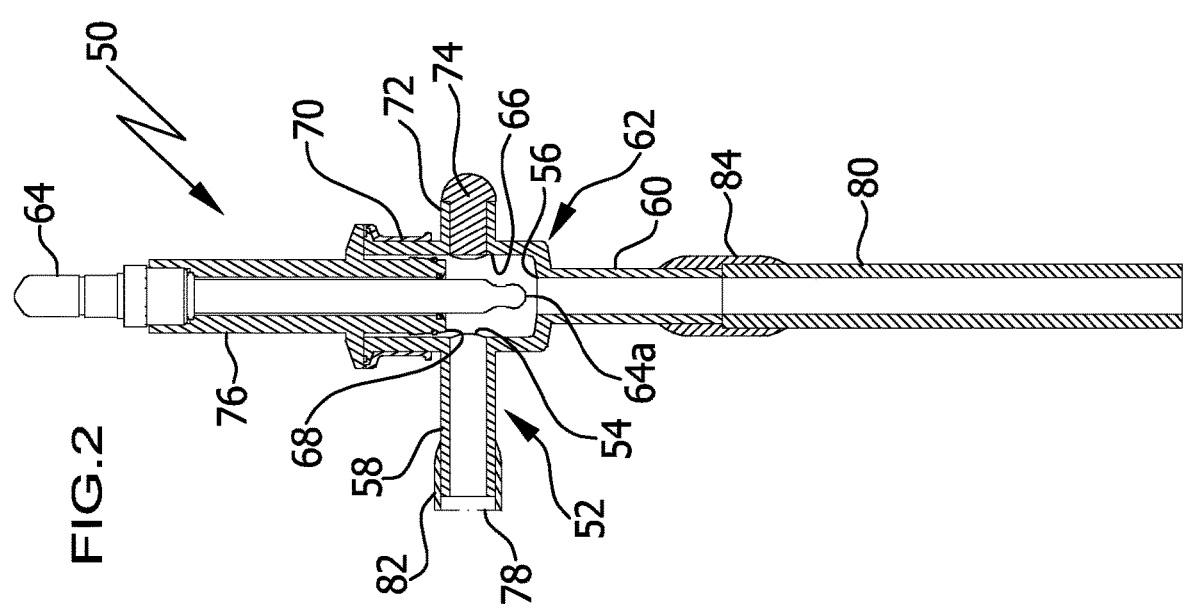

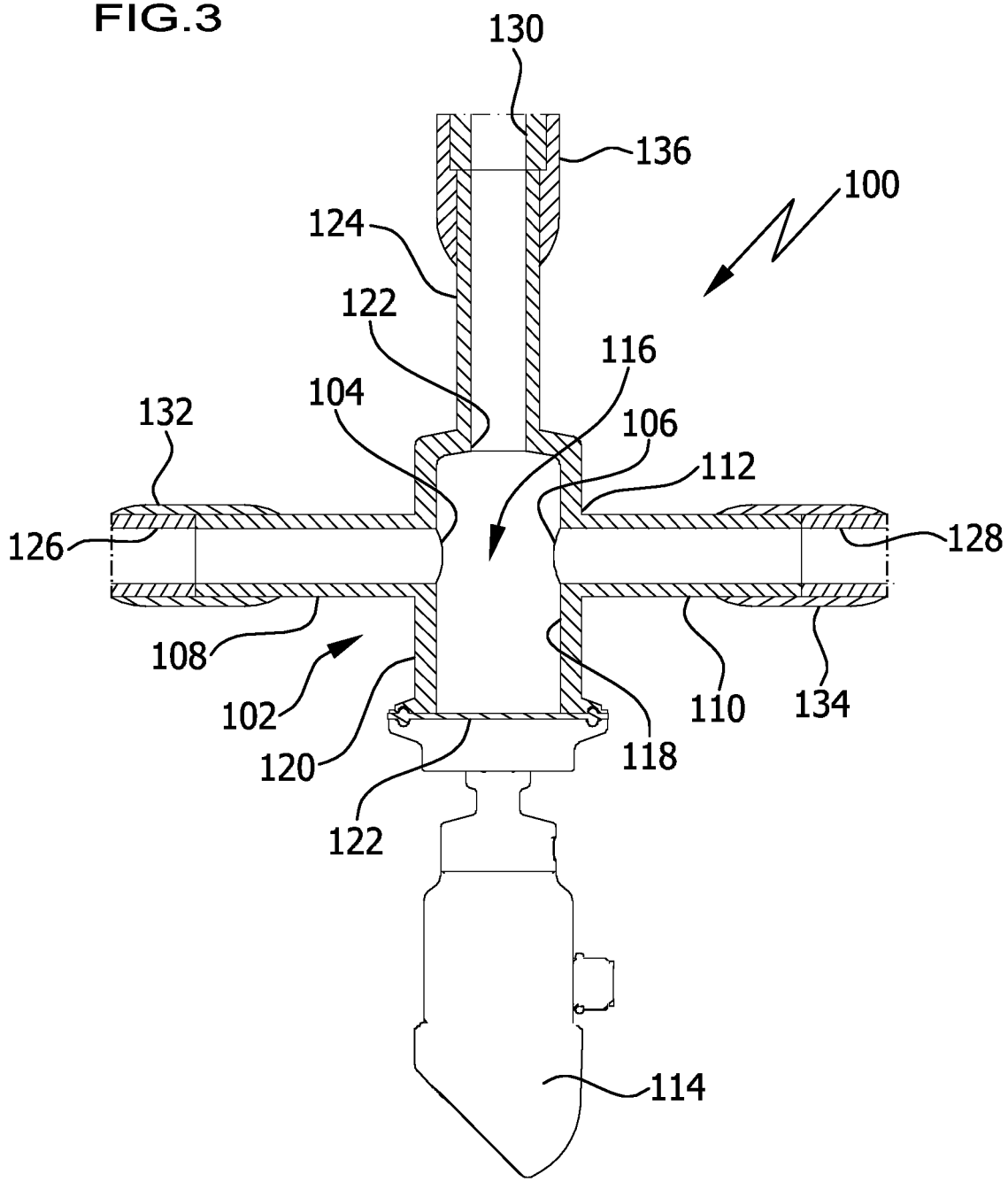

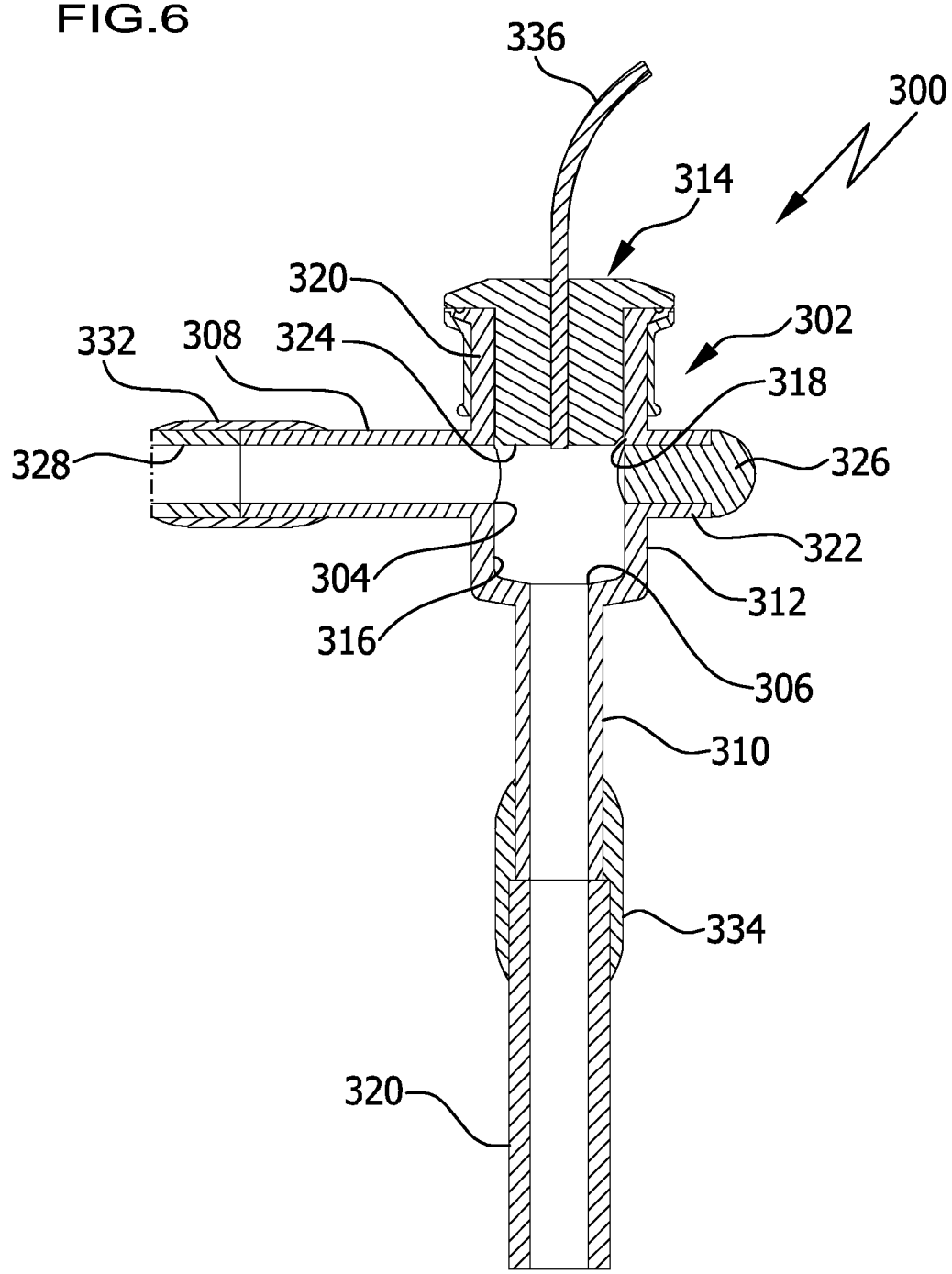

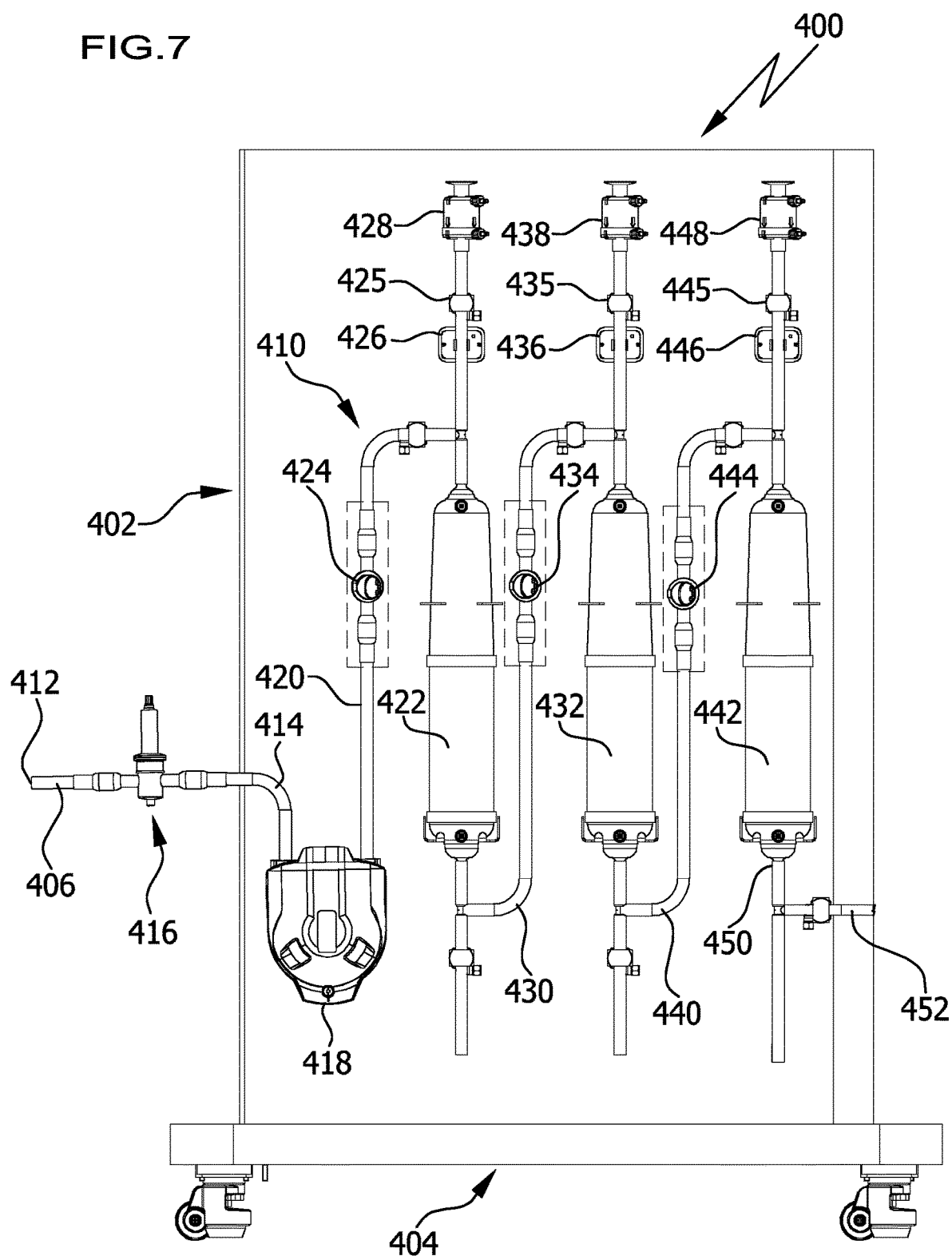

FLOW CELL FOR USE IN A FLUID MANAGEMENT AND/OR PROCESSING SYSTEM

CROSS-REFERENCE TO RELATED APPLICATIONS

This patent application claims the benefit of under USC 119 of European Patent Application No. 20 170 154.7, filed Apr. 17, 2020, which is incorporated by reference.

TECHNICAL FIELD

The present invention relates to a flow cell for use in a fluid management and/or processing system.

The invention furthermore relates to a fluid management and/or processing system comprising a tubing arrangement comprising one or more flow cells.

BACKGROUND OF THE INVENTION

Fluid management and/or processing systems, e.g., bio-processing systems or filtration systems typically include fluid management systems including a number of containers, e.g., bags or totes, that contain a variety of fluids, e.g., buffer solutions, for use in a bioprocessing application.

The buffer solutions are typically made at full strength and produced in large quantities for storage in respective totes.

For a typical bioprocessing application multiple buffer solutions are used for the demand of each buffer solution on the order of, e.g., 2000 l for each buffer.

The totes are then transported from the buffer preparation area to the process suite. As a result, bioprocessing process operations and their buffer preparation area with the buffer totes can consume a substantial footprint.

Similar challenges exist in other fluid management and/or processing systems.

There is a continued need in the art to provide additional solutions to enhance the management of broad variety of fluids, e.g., buffer solutions, used in various bioprocessing applications. For example, there is a continued need for techniques for managing the supply of buffer solutions used in a bioprocessing application in an efficient manner.

BRIEF SUMMARY OF THE INVENTION

The present invention provides for a flow cell for use in a fluid management and/or processing system. The flow cell according to the present invention comprises a body having an inlet and an outlet and a fluid flow channel extending from the inlet to the outlet of the body. The body of the flow cell further comprises a receptacle comprising a chamber forming a part of the fluid flow channel of the body. Said chamber comprises a first opening for connecting a functional element to the flow cell such that the functional element is in contact with or exposed to a fluid flow passing through the fluid flow channel. The flow cell further comprises a first tubular connector arranged adjacent to the inlet of the body and a second tubular connector arranged adjacent to the outlet of the body. The fluid cell according to the present invention furthermore comprises a fluid flow path extending from the first tubular connector through the inlet of the body, the body and its receptacle to the outlet of the body to the second tubular connector.

In many applications, the functional element is needed to control, modify or otherwise administrate the use of the fluids processed in the fluid management and/or processing system.

Thus, the present invention provides for a flow cell which may be used in a broad variety of applications, especially by accommodating a broad variety of functional elements.

The present invention further provides for a fluid processing system comprising a tubing arrangement comprising one or more of the flow cells according to the present invention.

DETAILED DESCRIPTION OF THE INVENTION

Preferably, the flow cell according to the present invention provides for a fluid flow path having a predetermined, essentially consistent cross-sectional area at least within and along the first and second tubular connectors and more preferably, the cross sectional area of the fluid flow path along the flow channel corresponds essentially to the cross-sectional area in the first and second tubular connectors.

In a preferred embodiment of the inventive flow cell, the volume of the chamber of the body is designed to provide a cross-sectional area of the fluid flow path equal to or larger than the cross-sectional area of the fluid flow path within and along the first and second tubular connectors, preferably also once the functional element is mounted in the opening and optionally extends into the chamber.

Thus, the flow cell according to the present invention provides for an unobstructed fluid flow through the flow cell independent of the type of functional element accommodated in the opening of the chamber.

In many embodiments the tubular connectors of the flow cell are directly attached to the body, more preferably said tubular connectors are formed integrally with the body.

According to a preferred embodiment, the body and/or the tubular connectors of the fluid flow cell are made of a plastics material, said plastics material being preferably selected from polycarbonate, polypropylene, polysulfone, polyethersulfone, polybutylene terephthalate, polyethylene terephthalate, polyetherether ketone, polyetherimide, low density polyethylene, high density polyethylene, and silicone (polysiloxane). Alternatively, the body and/or the tubular connectors of the flow cell may be made from metal, especially stainless steel.

According to one embodiment of the inventive flow cell, the fluid flow channel has a straight configuration. Consequently, the first and the second tubular connectors are arranged at opposite portions of the chamber extending away from one another.

According to another embodiment, the flow cell comprises a fluid flow channel that is of a curved or arcuate configuration, an angled configuration, preferably a 90 degree angled configuration, or a T-shaped configuration.

Thus, the various embodiments of the flow cell having different configurations may be used and adapted to the different environments as required by the specific fluid management and/or processing system.

According to a preferred embodiment of the present invention, the chamber of the receptacle of the flow cell has a second opening opposite the first opening, said second opening optionally providing either the inlet or the outlet of the body.

In many embodiments the flow cell according to the present invention incorporates a receptacle having a chamber which is essentially of a hollow cylindrical shape.

According to a further preferred embodiment of the present invention, the receptacle comprises at the first opening of the chamber a circular projection extending away from said body to sealingly receive the functional element.

Thus, a simple configuration of the flow cell and its functional element depending on the need of a specific process and/or processing system may be obtained.

Furthermore, the first opening of the chamber may accommodate an adapter for positioning one end of the functional element in a predefined position within the chamber. Thus, the functional element may be precisely positioned so as to reliably ensure the function of said functional element.

The functional elements that may be used for an inventive flow cell may be selected from a broad variety of functional elements already stated above.

Preferred types of functional elements are a static mixer, a conductivity sensor, a pH sensor, a pressure sensor, an electrical grounding element, a redox sensing element, a temperature sensor, a capacitive sensor, a flow sensor, an optical sensor, e.g., a UV sensor, and an element for taking liquid samples.

In case the functional element is selected from a conductivity sensor and a pH sensor, preferably a probe end of the sensor extending into the chamber of the flow cell is positioned such that it keeps a distance to all wall parts of the chamber of about 12 mm or more, preferably of about 15 mm or more. Furthermore, it is preferable that all the dimensions of the chamber perpendicular to the direction the sensor with its probe end extends into the chamber is about 25 mm or more, more preferably about 28 mm or more, and in particular about 70 mm or less, preferably about 50 mm or less. In case the chamber is of a hollow cylindrical shape such dimension corresponds to the inner diameter of the chamber. Typically, the diameter of a probe end of such sensors is about 12 mm.

Preferred flow cells according to the present invention are designed for single use. In addition, the flow cells may be sterilizable and thus provide the opportunity that the flow cell may be used in broad variety of bioprocessing systems handling fluids designed for medical use or for use in the pharmaceutical field.

Furthermore, the inventive flow cells may be designed with a standard geometry adaptable to a broad variety of functional elements, especially sensors. The inventive flow cells may also be designed as an integral part of a fluid processing system, especially by overmolding same with tubings of a tubing arrangement. In addition, a plurality of flow cells according to the present invention may be set up serially providing an entity with a plurality of different functional elements. This may be accomplished by directly connecting the tubular connectors of two subsequent flow cells and overmold the end portions of the connectors without the use of any further components.

As noted above, the invention is also directed to a fluid management and/or processing system comprising a tubing arrangement of some complexity comprising one or more flow cells according to the present invention.

The fluid processing system may form a part of a broad range of bioprocessing systems, preferably systems comprising biocontainer assemblies for a buffer management and/or identification system, bulk fill manifolds and virus inactivation manifolds. Further, the fluid processing system according to the present invention may form a part of a filtration system, in particular a depth filtration system, a sterile filtration system or a virus filtration system.

Further and alternative aspects and features of the disclosed principles will be appreciated from the following detailed description and the accompanying drawings. As will be appreciated, the flow cells disclosed herein are capable of being used in other and different environments, and are capable of being modified in various respects. Accordingly, it is to be understood that both the foregoing general description and the following detailed description are merely exemplary and explanatory and do not restrict the scope of the appended claims.

BRIEF DESCRIPTION OF THE SEVERAL VIEWS OF THE DRAWINGS

FIG. 2 shows a further embodiment of a flow cell according to the present invention;

FIG. 3 shows a further embodiment of a flow cell according to the present invention;

FIG. 4 shows a part of a tubing arrangement of a fluid management and/or processing system of the present invention incorporating multiple inventive flow cells;

FIG. 6 shows a further embodiment of a flow cell according to the present invention;

FIG. 7 shows a fluid management and processing system according to the present invention incorporating a plurality of inventive flow cells;

DETAILED DESCRIPTION OF THE DRAWINGS

Figure 1:
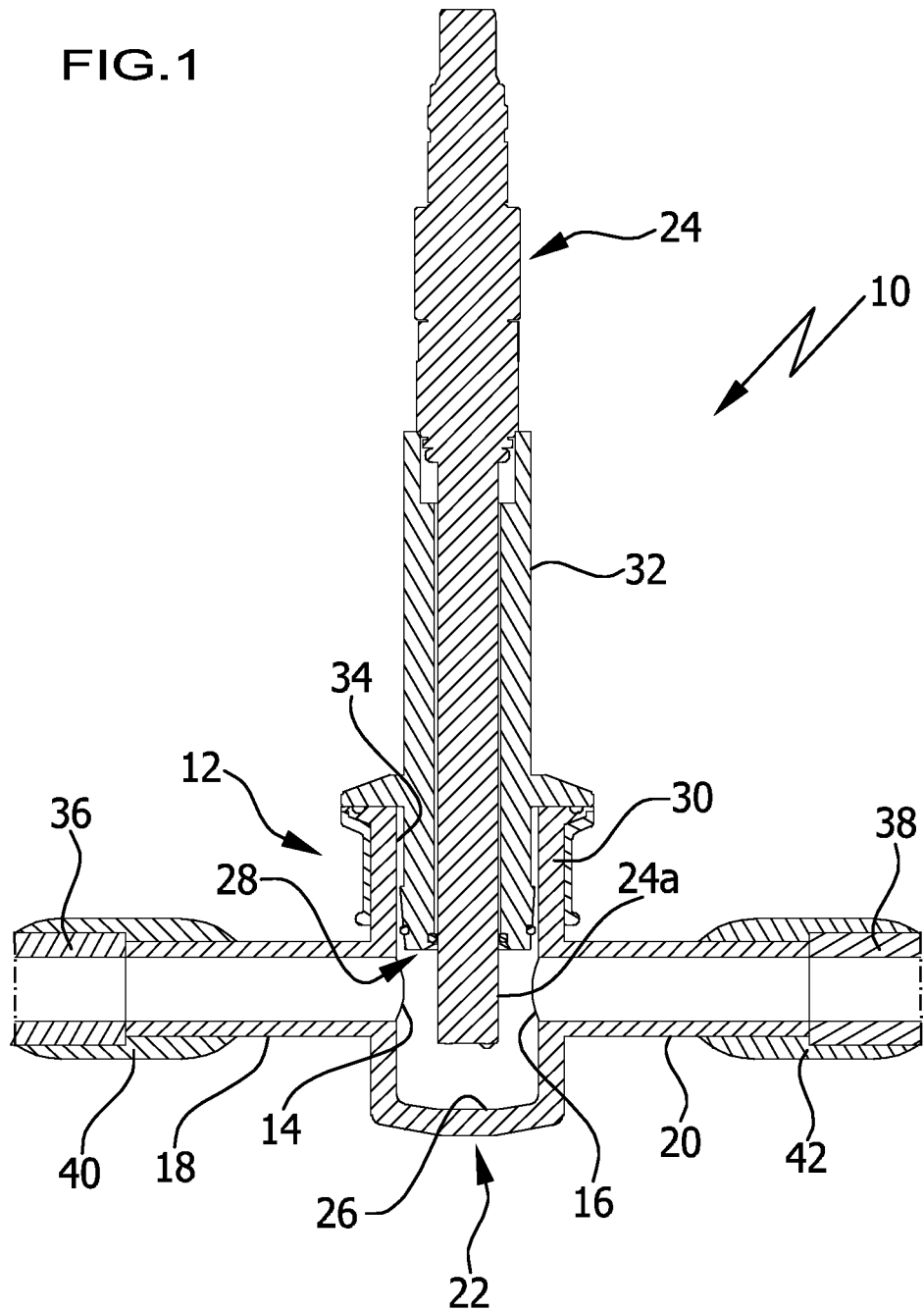
FIG. 1 shows a first embodiment of a flow cell according to the present invention.

FIG. 1 shows a first embodiment of a flow cell 10 according to the present invention comprising a body 12 having an inlet 14 and an outlet 16 and a fluid flow channel extending from the inlet 14 to the outlet 16 of the body 12. The inlet 14 and the outlet 16 are arranged at opposite portions of the body, and the fluid flow channel extends in a straight configuration from the inlet 14 to the outlet 16.

The inventive flow cell 10 further comprises a first tubular connector 18 and a second tubular connector 20 arranged adjacent to the inlet 14 and the outlet 16, respectively.

The body 12 of the flow cell 10 further comprises a receptacle 22 with a chamber 26 of an essentially hollow cylindrical shape for accommodating a functional element 24, said chamber 26 forming a part of the fluid flow channel of the body 12. The chamber 26 comprises at one end of the hollow cylindrical shape a first opening 28 providing an access for the functional element 24 to the chamber 26. The first opening 28 of the chamber 26 comprises a circular projection 30 extending away from the body 12 in a direction perpendicular to the flow channel of the body 12.

In the embodiment of FIG. 1 the body 12, the first and second tubular connectors 18, 20, the receptacle 22 as well as the circular projection 30 are preferably formed, in particular moulded, as one integral part, e.g., from a silicone material.

The functional element 24 may be a conductivity sensor probe and is mounted in the circular projection 30 of the receptacle 22 via a sensor probe support 32. The sensor probe support 32 extends into the circular projection 30 and sealingly accommodates the conductivity sensor probe 24 such that a sensor probe end 24a is positioned within the volume of the chamber 26 and is exposed to the fluid flow passing through the fluid flow channel of the flow cell 10. The volume of the chamber 26 is preferably configured such that the cross-section of the flow channel within the chamber 26 is essentially consistent with the cross-section of the flow channel in the remainder of the flow cell 10 also once the conductivity sensor probe 24 is mounted in the circular projection 30 and its probe end 24a extends into the chamber 26.

Furthermore, it is preferable to design the chamber 26 and the adapter 32 such that the probe end 24a of the conductivity sensor 24 keeps a predefined distance to all wall parts of the chamber 26, more preferably such that the sensing electrodes at the probe end 24a of the conductivity sensor 24 are spaced apart from the wall parts of the chamber 26 by 12 mm or more, most preferably 15 mm or more. Based on the typical dimensions of the conductivity sensor 24—the diameter of the probe end is typically about 12 mm—an inner diameter of the hollow cylindrical chamber 26 is preferably from about 28 mm to about 50 mm.

The sensor probe support 32 sealingly abuts an inner surface 34 of the circular projection 30 such that the fluid flow channel is completely sealed off against the environment of the flow cell 10.

The flow cell 10 of the present invention may be sealingly connected to a tubing arrangement (here represented by tube endings 36, 38) via the first and second tubular connectors 18, 20 by pipe couplings 40, 42. The pipe couplings 40, 42 may be formed by overmolding the free ends of the tubular connectors 18, 20 and the tube endings 36, 38, respectively.

FIG. 2 shows a further embodiment of a flow cell 50 according to the present invention comprising a body 52 having an inlet 54 and an outlet 56 and a fluid flow channel extending from the inlet 54 to the outlet 56 of the body 52. The body 52 of the flow cell 50 comprises a receptacle 62 for accommodating a functional element 64, which may be a pH sensor probe.

The inventive flow cell 50 further comprises a first tubular connector 58 and a second tubular connector 60 arranged adjacent to the inlet 54 and the outlet 56, respectively.

The receptacle 62 comprises a chamber 66 of an essentially hollow cylindrical shape for accommodating the functional element, i.e., the pH sensor probe 64. The chamber 66 forms a part of the fluid flow channel of the body 52. The chamber 66 comprises at one end of the hollow cylindrical shape a first opening 68 providing an access for the functional element 64 to the chamber 66. The first opening 68 of the chamber 66 comprises a circular projection 70 extending away from the body 52. In contrast to the embodiment shown in FIG. 1, the chamber 66 of the body 52 of the flow cell 50 comprises a second opening at the opposite end of the cylindrical shape, which serves as the outlet 56 of the body 52. Thus, the fluid flow channel of the body 52 is angled at 90 degrees.

In the embodiment of FIG. 2 the body 52, the first and second tubular connectors 58, 60, the receptacle 62 as well as the circular projection 70 are preferably formed, in particular moulded, as one integral part, e.g., from a silicone material.

The body 52 may have a further tubular connector 72 extending from the body 58 and its receptacle 62 in a direction opposite to the first tubular connector 58. While this tubular connector 72 may also serve to provide a further fluid flow into or from the chamber 66, it is closed by a plug 74 in the embodiment shown in FIG. 2.

The pH sensor probe 64 is mounted in the circular projection 70 of the opening 68 via a sensor probe support or holder 76. The sensor probe holder 76 extends into the circular projection 70 and sealingly accommodates the pH sensor probe 64 such that a sensor probe end 64a is positioned within the volume of the chamber 66 and is directly exposed to the fluid flow passing through the fluid flow channel of the flow cell 50. The volume of the chamber 66 is preferably configured such that the cross-section of the flow channel within the chamber 66 is essentially consistent with the cross-section of the flow channel in the remainder of the flow cell 50, also once the pH sensor probe 64 is mounted in the circular projection 70 and its end 64a extends into the chamber 66.

The sensor probe holder 76 sealingly abuts an inner surface of the circular projection 70 such that the fluid flow channel is completely sealed off against the environment of the flow cell 50.

The flow cell 50 of the present invention may be sealingly connected to a tubing arrangement (here represented by tube endings 78, 80) via the first and second tubular connectors 58, 60 by pipe couplings 82, 84. The pipe couplings 82, 84 may be formed by overmolding the free ends of the tubular connectors 58, 60 and the tube endings 78, 80, respectively.

FIG. 3 shows another embodiment of an inventive flow cell 100 comprising a body 102 having an inlet 104 and an outlet 106 and a fluid flow channel extending from the inlet 104 to the outlet 106 of the body 102. The inlet 104 and the outlet 106 are arranged at opposite portions of the body 102, and the fluid flow channel extends in a straight configuration from the inlet 104 to the outlet 106.

The inventive flow cell 100 further comprises a first tubular connector 108 and a second tubular connector 110 arranged adjacent to the inlet 104 and the outlet 106, respectively.

The body 102 of the flow cell 100 further comprises a receptacle 112 with a chamber 116 of an essentially hollow cylindrical shape, said chamber 116 forming a part of the fluid flow channel of the body 102. The chamber 116 comprises at one end of the hollow cylindrical shape a first opening 118 for connecting a functional element 114 to the chamber 116. The first opening 118 of the chamber 116 comprises a circular projection 120 extending away from the body 102 in a direction perpendicular to the flow channel of the body 102.

The functional element 114 in FIG. 3 is designed as a pressure sensor. The pressure sensor 114 may be in direct contact with the fluid passing through the flow path of the flow cell 100 or, as it is shown in FIG. 3, in indirect contact via a closure element 122. The closure element 122 is designed such as to transmit the pressure within the flow cell 100 and may form a part of the pressure sensor 114 or be designed as a separate part or adapter to be mounted on the flow cell 100, i.e., its opening 118 and the circular projection 120, respectively.

So far, the structure of the flow cell 100 corresponds essentially to the structure of the flow cell 10 shown in FIG. 1. However, the chamber 116 of the receptacle 112 of the flow cell 100 is provided with a second opening 122 located at an end of the hollow cylindrical shape of the chamber 116 opposite to the one end accommodating the first opening 118. The opening 122 connects to a third tubular connector 124. Thus, the flow cell 100 may provide for an additional functionality as compared to the flow cell 10 of FIG. 1.

In the embodiment of FIG. 3, the body 102, the first, second and third tubular connectors 108, 110, 124, the receptacle 112 as well as the circular projection 120 are preferably formed, in particular molded, as one integral part, e.g., from a silicone material.

The flow cell 100 of the present invention may be sealingly connected to a tubing arrangement (here represented by tube endings 126, 128, 130) via the first, second and third tubular connectors 108, 110, 124 by pipe couplings 132, 134, 136. This embodiment of the inventive flow cell is one example for a flow cell having a T-shaped flow channel configuration. The pipe couplings 132, 134, 136 may be formed by overmolding the free ends of the tubular connectors 108, 110, 124 and the tube endings 126, 128, 130, respectively.

FIG. 4 shows a cross section of a part of a tubing arrangement 150, e.g., of a fluid management and/or processing system according to the present invention. On the right hand side, the tubing arrangement 150 incorporates the flow cell 50 of FIG. 2. On the left, the tubing arrangement 150 connects to a flow cell 160, which essentially corresponds in its structure to the flow cell 50. However, the functional element accommodated in the flow cell 160 is a conductivity sensor probe 162.

Furthermore, the tubing arrangement 150 shown in FIG. 4 comprises a further inventive flow cell 100 according to the present invention accommodating a pressure sensor 114 as a functional element. The flow cell 100 has already been described in more detail above in connection with FIG. 3.

The flow cell 100 furthermore provides for the possibility to connect an air filter 170 to the tubing arrangement 150 for venting integrity testing of the arrangement 150.

From FIG. 4 it is readily apparent how the flow cells of the present invention allow a set-up of multi-functional control and/or processing means with minimum tubing and footprint. In this embodiment, the flow cells of the present invention are directly connected to one another (serialized) by overmolding their abutting tubular connectors.

FIGS. 5A to 5D show two further embodiments of a flow cell according to the present invention.

Figure 5A:
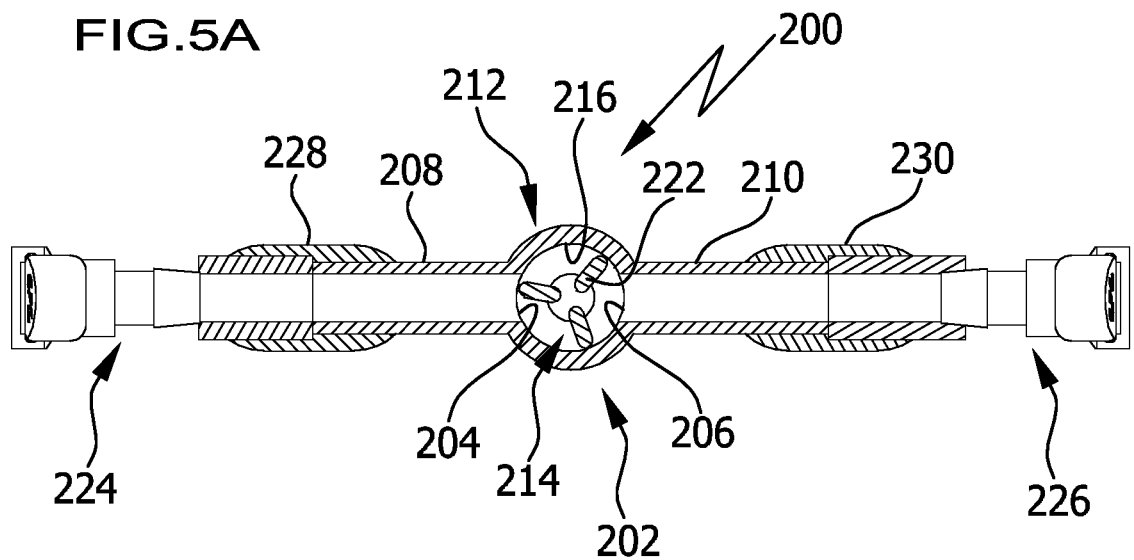
FIGS. 5A, 5B, 5C and 5D show two further embodiments of a flow cell of the present invention in different perspectives.
Figure 5D:
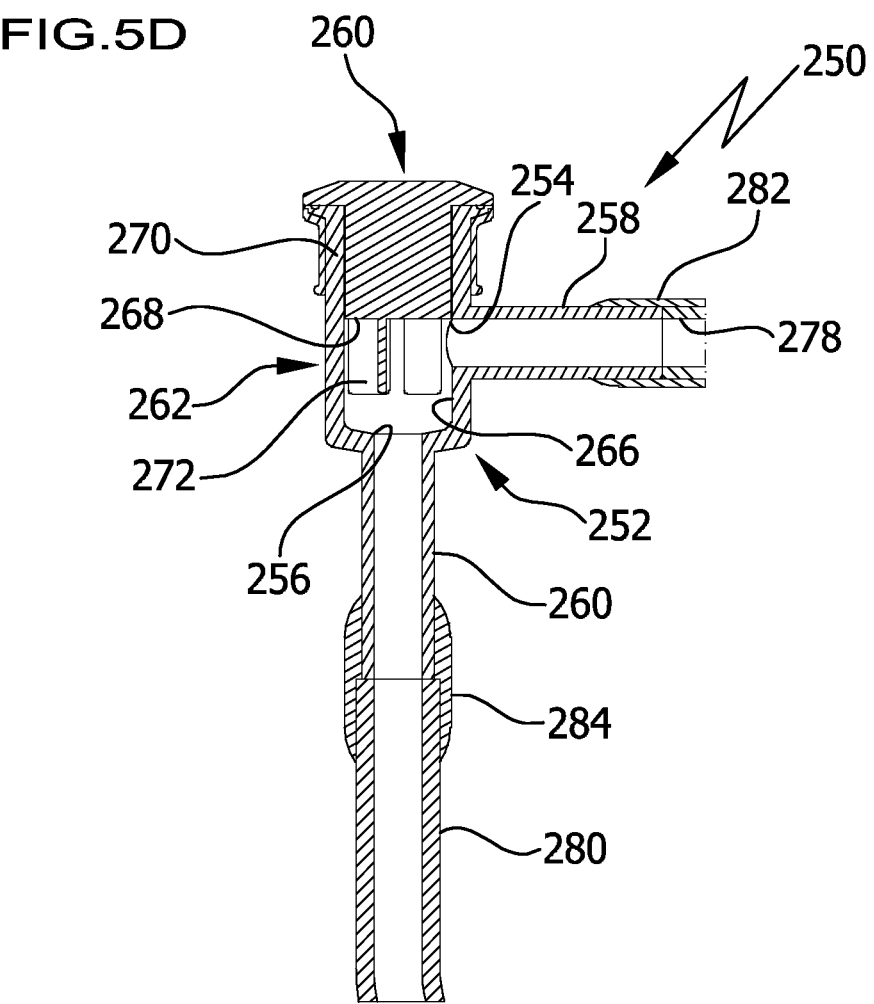
Figure 5B:
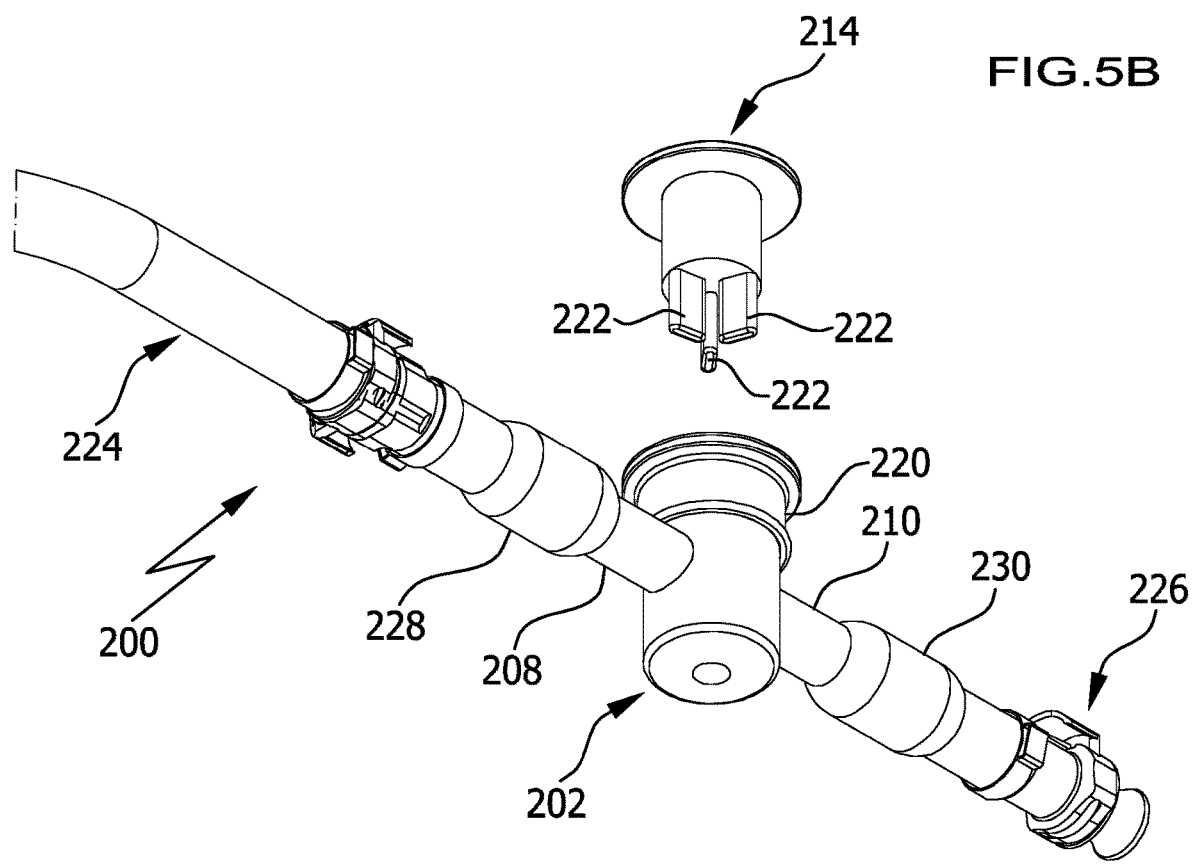
Figure 5C:
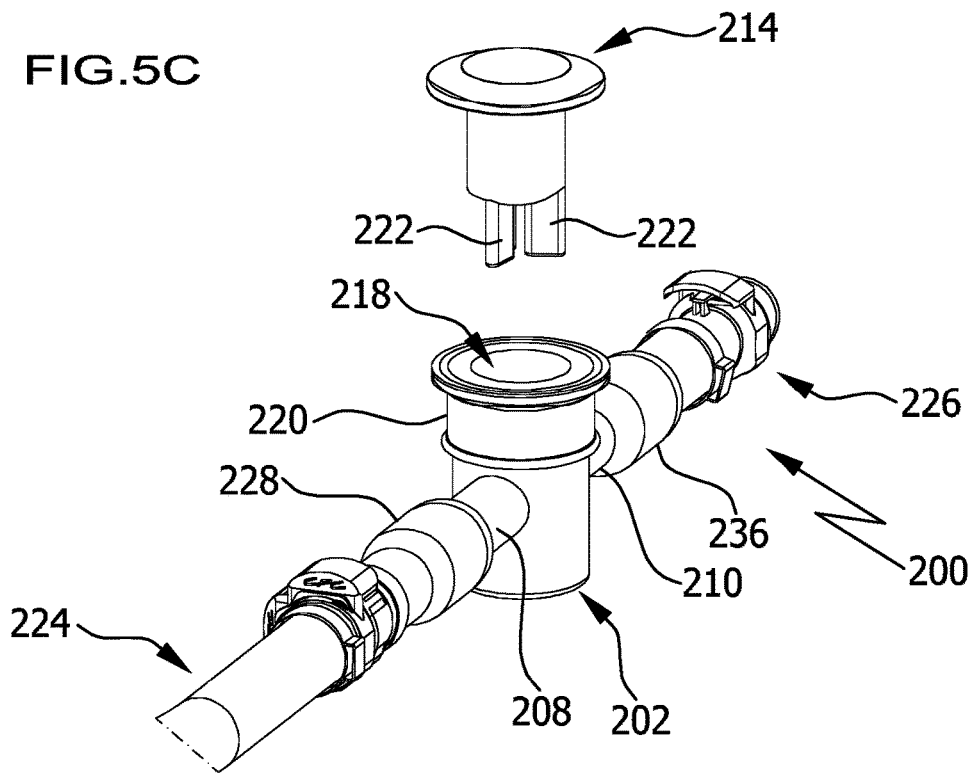

FIGS. 5A to 5C show a flow cell 200 in a cross-sectional and two different perspective views, respectively.

FIG. 5A shows a cross-sectional view of the flow cell 200 comprising a body 202 having an inlet 204 and an outlet 206 and a fluid flow channel extending from the inlet 204 to the outlet 206 of the body 202. The inlet 204 and the outlet 206 are arranged at opposite portions of the body 202, and the fluid flow channels extends in a straight configuration from the inlet 204 to the outlet 206.

The inventive flow cell 200 further comprises a first tubular connector 208 and a second tubular connector 210 arranged adjacent to the inlet 204 and the outlet 206, respectively.

The body 202 of the flow cell 200 further comprises a receptacle 212 with a chamber 216 of an essentially hollow cylindrical shape for accommodating a functional element 214, here in the form of a static mixing element.

Again, the chamber 216 forms a part of the fluid flow channel of the body 202. The chamber 216 comprises at one end of the hollow cylindrical shape a first opening 218 providing an access for the static mixing element 214 to the chamber 216. The first opening 218 of the chamber 216 comprises a circular projection 220 extending away from the body 202 in a direction perpendicular to the flow channel of the body 202. The static mixer 214 is sealingly mounted in the circular projection 220 of the receptacle 212. The static mixer 214 comprises three mixing fins 222 projecting into the chamber 216 thereby effecting a turbulent fluid flow resulting in a thorough mixing of the components of a fluid passing through the flow cell 200.

In the embodiment of FIGS. 5A to 5C the body 202, the first and second tubular connectors 208, 210, the receptacle 212 as well as the circular projection 220 are formed, in particular molded, as one integral part, e.g., from a silicone material.

The volume of the chamber 216 is preferably configured such that the cross-section of the flow channel within the chamber 216 is essentially consistent with the cross-section of the flow channel in the remainder of the flow cell 200 or larger also once the static mixer 214 is mounted in the circular projection 220 and its fins 222 extend into the chamber 216.

The flow cell 200 of the present invention may be sealingly connected to a, e.g., flexible tubing arrangement (here represented by tube endings 224, 226) via the first and second tubular connectors 208, 210 by pipe couplings 228, 230. The pipe couplings 228, 230 may be formed by overmolding the free ends of the tubular connectors 208, 210 and the tube endings 224, 226, respectively.

FIG. 5D shows a variant of the flow cell 200 in the form of a flow cell 250, wherein the fluid flow channel is of a 90 degree angled configuration instead of a straight configuration as in flow cell 200.

The flow cell 250 according to the present invention comprises a body 252 having an inlet 254 and an outlet 256 and a fluid flow channel extending from the inlet 254 to the outlet 256 of the body 252. The body 252 of the flow cell 250 comprises a receptacle 262 providing a chamber 266 for accommodating a functional element 264, which may be static mixer.

The inventive flow cell 250 further comprises a first tubular connector 258 and a second tubular connector 260 arranged adjacent to the inlet 254 and the outlet 256, respectively.

The chamber 266 of the receptacle 262 has an essentially hollow cylindrical shape for accommodating the functional element, such as the static mixer 264. The chamber 266 forms a part of the fluid flow channel of the body 252. The chamber 266 comprises at one end of the hollow cylindrical shape a first opening 268 providing an access for the static mixer 264 to the chamber 266. The receptacle 262 comprises at the first opening 268 of the chamber 266 a circular projection 270 extending away from the body 252.

In contrast to the embodiment shown in FIGS. 5A to 5C the chamber 266 of the body 252 of the flow cell 250 comprises a second opening at the opposite end of the cylindrical shape, which serves as the outlet 256 of the body 252. Thus, the fluid flow channel of the body 252 is angled at 90 degrees.

In the embodiment of FIG. 5D, the body 252, the first and second tubular connectors 258, 260, the receptacle 262 as well as the circular projection 270 are preferably formed, in particular moulded, as one integral part, e.g., from a silicone material.

The static mixer 264 is sealingly mounted in the circular projection 270 of the receptacle 262, and its mixing fins 272 extend into the chamber 266. Thus, the fins 272 are exposed to the fluid flow passing through the fluid flow channel of the flow cell 250 and provide for a thorough mixing of the components of the fluid passing through the flow cell 250. The volume of the chamber 266 is preferably configured such that the cross-section of the flow channel within the chamber 266 is essentially consistent with or larger than the cross-section of the flow channel in the remainder of the flow cell 250, also once the static mixer 264 is mounted in the circular projection 720 and its fins 272 extend into the chamber 266.

The flow cell 250 of the present invention may be sealingly connected to a tubing arrangement (here represented by tube endings 278, 280) via the first and second tubular connectors 258, 260 by pipe couplings 282, 284. The pipe couplings 282, 284 may be formed by overmolding the free ends of the tubular connectors 258, 260 and the tube endings 278, 280, respectively.

FIG. 6 shows a further embodiment of a flow cell 300 according to the present invention comprising a body 302 having an inlet 304 and an outlet 306 and a fluid flow channel extending from the inlet 304 to the outlet 306 of the body 302. The body 302 of the flow cell 300 comprises a receptacle 312 for accommodating a functional element 314, which may be an electrical grounding element.

The inventive flow cell 300 further comprises a first tubular connector 308 and a second tubular connector 310 arranged adjacent to the inlet 304 and the outlet 306, respectively.

The receptacle 312 comprises a chamber 316 of an essentially hollow cylindrical shape for accommodating the functional element, such as the electrical grounding element 314. The chamber 316 forms a part of the fluid flow channel of the body 302. The chamber 316 comprises at one end of the hollow cylindrical shape a first opening 318 providing an access for the functional element 314 to the chamber 316. The first opening 318 of the chamber 316 comprises a circular projection 320 extending away from the body 302. The electrical grounding element 314 is sealingly mounted in said circular projection 320.

The chamber 316 of the body 302 of the flow cell 300 comprises a second opening at the opposite end of the cylindrical shape, which serves as the outlet 306 of the body 302. Thus, the fluid flow channel of the body 302 is angled at 90 degrees.

In the embodiment of FIG. 6 the body 302, the first and second tubular connectors 308, 310, the receptacle 312 as well as the circular projection 320 are preferably formed, in particular moulded, as one integral part, e.g., from a silicone material.

The body 302 may have a further tubular connector 322 extending from the body 302 and its receptacle 312 in a direction opposite to the first tubular connector 308. While this tubular connector 322 may also serve to provide a further fluid flow into or from the chamber 316, it is closed by a plug 326 in the embodiment shown in FIG. 6.

The electrical grounding element 314 is mounted in the circular projection 320 of the opening 318 such as to abut with its lower surface 324 the volume of the chamber 316. An earthing wire 336 of the electrical grounding element 314 extends through the electrical grounding element 314 down to the lower surface 324 and is in direct contact with the fluid flow directed through the flow cell 300.

The volume of the chamber 316 is preferably configured such that the cross-section of the flow channel within the chamber 326 is larger than the cross-section of the flow channel in the remainder of the flow cell 300.

The flow cell 300 of the present invention may be sealingly connected to a tubing arrangement (here represented by tube endings 328, 330) via the first and second tubular connectors 308, 310 by pipe couplings 332, 334. The pipe couplings 332, 334 may be formed by overmolding the free ends of the tubular connectors 308, 310 and the tube endings 328, 330, respectively.

FIG. 7 shows a fluid management system according to the present invention especially designed as a bulk fill manifold 400. The manifold 400 comprises a complex tubing arrangement and incorporates a plurality of flow cells according to the present invention. The tubing arrangement and the further components including the flow cells according to the present invention are set up on a cabinet 402 which is preferably mounted on a skid 404 which is preferably designed to comprise a mobile support plate as shown in FIG. 7.

The fluid management system 400 receives via a tube 406 a liquid to be processed and distributed to a number of containers, bags or bottles from a first storage tank (not shown). The tube 406 extends to a pump mounted on the support 402 providing the fluid supply for the bulk fill manifold during operation.

At one front of the cabinet 402 as shown in FIG. 7 the tubing arrangement 410 is provided comprising an inlet port 412 and an inlet line 414 which incorporates a flow cell 416 according to the present invention. The flow cell 416 incorporates a temperature sensor module as a functional element.

The inlet line 414 is connected to a pump 418 which serves to provide a fluid flow from the inlet 412 to the tubing arrangement 410 and the components connected thereto.

The tubing arrangement 410 is connected to the pump 418 by a line 420 which provides a fluid flow path to a first filter element 422. The inlet part of the filter element 422 is connected to a liquid detector 426 and a vent/air filter 428 which serves at the start of the operation of the bulk fill manifold to evacuate air from the tubing arrangement 410. Between the liquid detector 426 and the vent/air filter 428 a valve 425 is provided which is open when air is evacuated from the tubing arrangement 410 and closed during normal operation of the fluid management system 400. In the supply line 420 another flow cell 424 according to the present invention is incorporated which accommodates a pressure sensor as a functional element.

The tubing arrangement 410 comprises a further line 430 connecting an outlet of the filter 422 to an inlet of a subsequently arranged filter 432. The connecting line 430 again incorporates a flow cell 434 according to the present invention which may also accommodate a pressure sensor as a functional element. The filter element 432 is also provided with a liquid detector 436 and an vent/air filter 438 serving the same purposes as the vent/air filter 428. Between the liquid detector 436 and the vent/air filter 438 a valve 435 is provided which is open when air is evacuated from the tubing arrangement 410 and closed during normal operation of the fluid management system 400.

At the outlet of the filter 432 a further line 440 is arranged to connect the outlet of the filter 432 to an inlet of a further filter 442. Again, the line 440 is provided with a flow cell 444 according to the present invention incorporating as a functional element a pressure sensor. The tubing arrangement 410 comprises a liquid detector 446 and a vent/air filter 448 for the same purposes as discussed before for the vents and air filters of the filter elements 422 and 432. Between the liquid detector 446 the vent/air filter 448 a valve 445 is provided which is open when air is evacuated from the tubing arrangement 410 and closed during normal operation of the fluid management system 400.

At the outlet 450 of the filter element 442 a connecting line 452 is provided to connect the tubing arrangement 410 with a further tubing arrangement serving the purpose to allow a plurality of receptacles being releasably connected to the bulk fill manifold 400 receiving the fluid filtered through the three subsequent filters 420, 432, and 442.

Fluid management and/or processing systems according to the present invention comprise a tubing arrangement comprising one or more of the inventive flow cells as will be further explained in more detail in connection with FIG. 8 below. The system may comprise a single use manifold that is configured to be removably mounted to a cabinet such that the manifold is in operable arrangement with a pneumatic and automation equipment stored within the cabinet of an inline dilution skid.

The manifold may be configured to be operably arranged with a so-called water for injection (in the following WFI) pump, a buffer pump, control valves, and a control unit stored within the cabinet of the dilution skid. The manifold is typically configured to selectively mix a supply of at least one concentrated buffer solution with a supply of WFI to produce a buffer solution having a desired buffer characteristic for use, e.g., in a bioprocessing application. After use in the intended bioprocessing application, the manifold can be disconnected from the inline dilution skid and replaced with another single use manifold having a similar construction.

Figure 8:
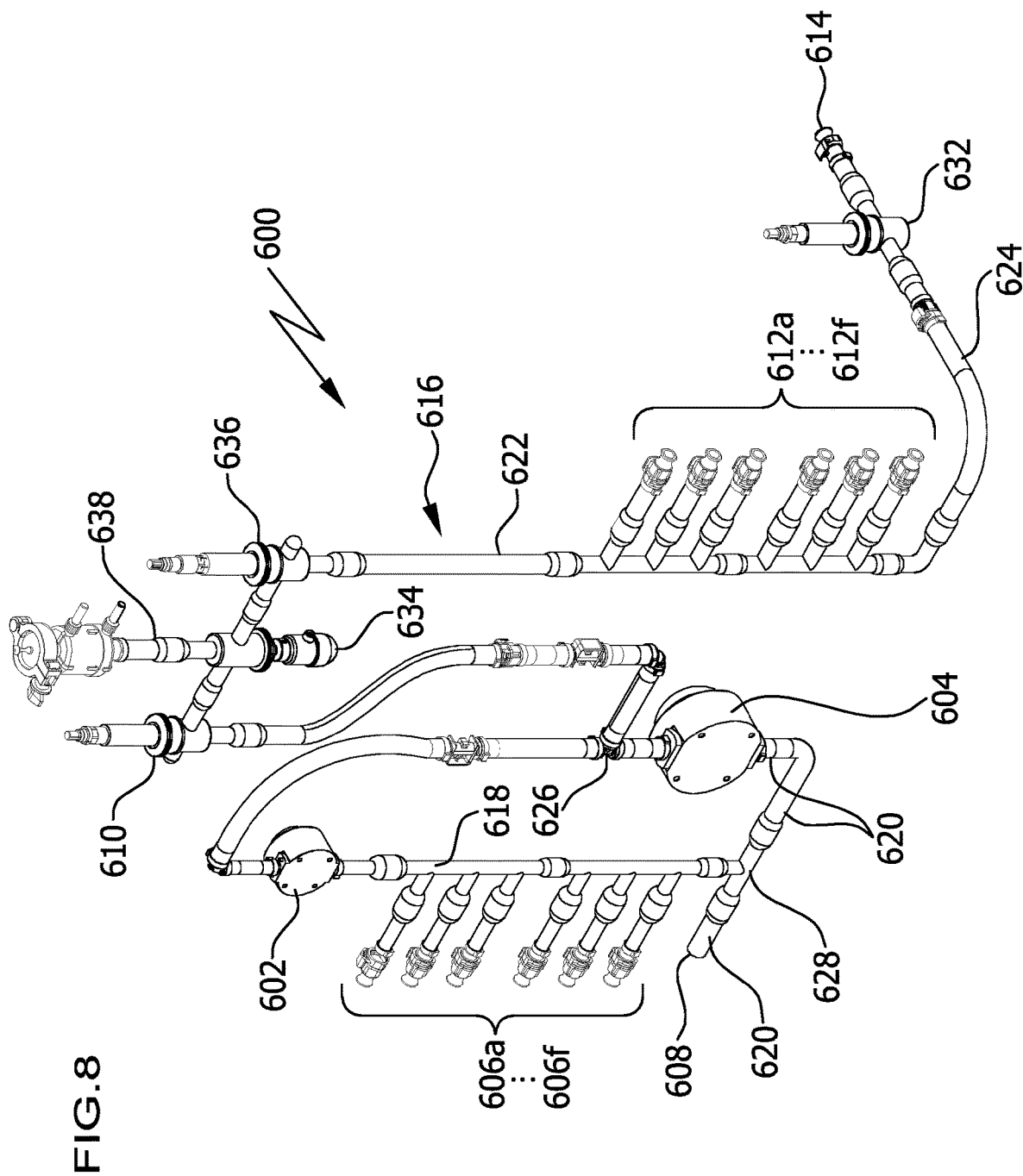
FIG. 8 shows a tubing arrangement of an inventive fluid management and processing system incorporating a plurality of inventive flow cells.

FIG. 8 shows an embodiment of such a manifold 600 suitable for use in a buffer management system constructed in accordance the present invention. The manifold 600 illustrated in FIG. 8 is in the form of a single use inline buffer dilution manifold. The manifold 600 is configured to be removably mounted to the inline dilution skid of the buffer management system.

The manifold 600 includes tubing, single use pumps heads, sensors and connections configured to selectively blend at least one concentrated buffer solution with WFI to produce a diluted buffer solution within a predetermined tolerance for a given buffer characteristic (such as, e.g., pH) as set out in more detail below.

The manifold 600 includes two single use pump heads 602, 604, one to deliver at least one buffer concentrate (pump head 602) and the other to deliver the WFI (pump head 604) for mixing with a buffer concentrate within the manifold 600 to produce a diluted buffer solution according to a predetermined buffer recipe.

The manifold 600 is arranged with the control unit of the dilution skid to provide automated operation of the buffer management system by, for example, varying pump speeds/ratios in response to at least one sensor feedback loop to achieve a desired buffer recipe from a library of multiple buffer recipes, selectively operating the control valves according to a predetermined operating sequence, and interfacing with other units of operation to respond to demands for buffer solution.

The manifold 600 includes a plurality of buffer inlet ports 606a to 606f, a WFI inlet port 608, the single use pumps 602, 604, at least one buffer characteristic sensor, e.g., a conductivity sensor 610, a plurality of buffer outlet ports 612a to 612f corresponding to the number of buffer inlet ports 606a to 606f, and a waste outlet port 614. The manifold 600 includes a tubing arrangement 616 configured to interact with a plurality of control valves (not shown) such that the control unit can operate the control valves to close, open or redirect the flow of liquid through the manifold 600 to perform a variety of buffer management sequences.

The tubing arrangement 612 has a buffer inlet line 618, the WFI inlet line 620, a discharge line 622, and a waste line 624. The tubing arrangement 616 interconnects the various ports 606a to 606f, 612a to 612f of the manifold 600 and is associated with the control valves to control the flow of buffer solution and WFI through the manifold 600. The tubing arrangement 616 may comprise a plurality of flexible tubing lines. The flexible tubing lines may be made from any suitable material, such as, silicone, thermoplastic elastomers (TPE), etc.

The manifold 600 includes six buffer inlet ports 606a to 606f that are in fluid communication with the buffer inlet line 618. A control valve (not shown) is interposed between each of the buffer inlet ports 606a to 606f and the buffer inlet line 618 to selectively control the flow of concentrated buffer solution through each one of the buffer inlet ports 606a to 606f into the buffer inlet line 618. The buffer pump 602 is associated with the buffer inlet line 618. The buffer pump 602 can be operated to pump at least one selected concentrated buffer solution from a concentrated buffer rack tower through the buffer inlet line 618.

The buffer inlet line 618 and the WFI inlet line 620 are in fluid communication with each other via a mixing junction 626 and a first drain junction 628. In the embodiment of FIG. 8, the mixing junction 626 is in the form of a flow cell according to the present invention comprising a fluid flow channel of a T-shaped configuration incorporating a static mixer as a functional element. A control valve (not shown) is disposed upstream of the first drain junction 628 in both the buffer inlet line 618 and the WFI inlet line 620.

The WFI inlet port 608 may be fluidly connected to a suitable WFI source (not shown). The WFI source may comprise a tank of WFI. Alternatively, the WFI may be produced using an on-site WFI generator. The WFI pump 604 may be operated to pump a supply of WFI from the WFI source through the WFI inlet line 620.

The manifold 600 includes six buffer outlet ports 612a to 612f that are in fluid communication with the discharge line 622. A control valve (not shown) is interposed between each of the buffer outlet ports 612a to 612f and the discharge line 622 to selectively control the flow of diluted buffer solution through each one of the buffer outlet ports 612a to 612f out of the manifold 600 to a diluted buffer rack tower (not shown).

The discharge line 622 is in fluid communication with both the buffer inlet line 618 and the WFI inlet line 620 via the mixing junction 626. The discharge line 622 is in fluid communication with the waste line 624 via a second drain junction 630. A control valve (not shown) is disposed both upstream and downstream of the second drain junction 630 in the waste line 624.

At least one sensor is associated with the discharge line and is configured to sense a value of a buffer characteristic (here a conductivity sensor 632), to generate a buffer characteristic signal indicative of the sensed value for the buffer characteristic, and to transmit the buffer characteristic signal to the control unit. The control unit can use the received buffer characteristic signal to control the operation of the buffer management system.

In addition to the first conductivity sensor 610, a pressure sensor 634, and a pH sensor 636, each of which is accommodated in a flow cell according to the present invention, are each associated with the discharge line 622 and are respectively configured to transmit a first conductivity signal, a pressure signal, and a pH signal to the control unit.

The buffer management program can use at least one of the conductivity signal and the pH signal to determine whether the buffer solution passing through the discharge line 622 is within a predetermined tolerance range of a given specification for a desired buffer. The buffer management program may also use the pressure signal of the pressure sensor 634 to determine whether the manifold 600 is operating below a predetermined maximum pressure for safe operation.

The discharge line 622 also has in fluid communication therewith an integrity test line 638. The integrity test line 638 can be used to conduct other suitable sampling and testing of the buffer solution being produced as will be appreciated by one skilled in the art.

The waste outlet port 614 is in fluid communication with the waste line 624. Fluid can be discharged from the waste line 624 out through the waste outlet port 614 into a suitable tank or facility drain.

The second conductivity sensor 632 is associated with the waste line 624 and is configured to transmit a second conductivity signal to the control unit. The buffer management program can be configured to use the second conductivity signal to identify the liquid passing through the waste line 624 as WFI.

The control unit is configured to automatically control the operation of at least one of the buffer pump 602 and the WFI pump 604 in response to information received via at least one sensor feedback loop to produce a desired buffer solution. The control unit is configured to control the pump speed/volume displacement of at least one of the buffer pump 602 and the WFI pump 604 to adjust the ratio of the concentrated buffer to the WFI being blended together in the discharge line 624 to achieve a desired buffer recipe.

The buffer management system constructed in accordance with principles of the present invention can reduce the space required in buffer preparation rooms relative to conventional approaches. In applications using a relatively large quantity of full strength buffer needed to be produced, for instance 2,000 L, only a 200 L tote (based on 10× dilution) can be used. In applications with a total volume of buffer for a campaign of 20,000 L, a 2,000 L of concentrated buffer solution (based on 10× dilution) can be used with a buffer management system constructed according to principles of the present invention.

The second conductivity signal can be sent to the control unit and used by the buffer management program to determine whether the diluted buffer solution passing through the waste line is within the specification for the selected buffer recipe. Because mixing of the concentrated buffer solution and the WFI can continue as the combines liquids pass through the waste line 624, it can be helpful to monitor the second conductivity signal to determine whether the diluted buffer solution is within the specification for the desired recipe to reduce the amount of solution diverted to the waste line 624.

Once the control unit determines that the diluted buffer solution being produced within the manifold is within the specification for the desired buffer recipe, the control unit can operate the manifold 600 so that the diluted buffer solution is directed to a selected one of the surge biocontainers of the diluted buffer rack towers. The diluted buffer solution stored in the selected surge biocontainer is ready to be sent to a process of operation.

Figure 9:
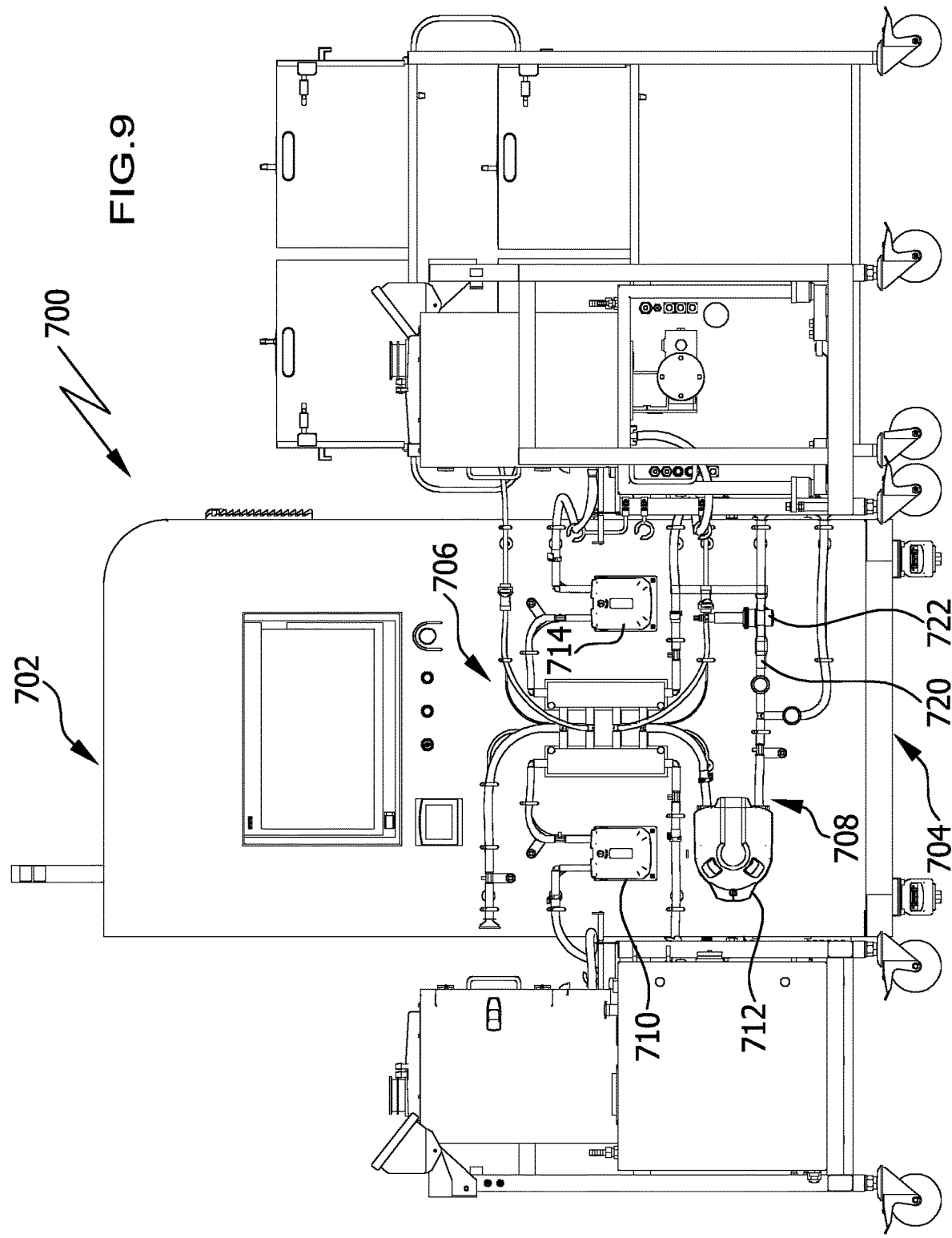
FIG. 9 shows an inventive fluid management and processing system incorporated into a virus inactivation manifold.

FIG. 9 shows a further example of a fluid management and/or processing system according to the present invention in the form of a virus inactivation manifold 700. The virus inactivation manifold 700 incorporates a cabinet 702 mounted on a skid 704.

Similar to the arrangement described already in connection with FIG. 7 the cabinet 702 supports a tubing arrangement 706 to be used to receive and deliver a fluid to be treated for virus inactivation, e.g., with an acid or a base.

The tubing arrangement 706 comprises a tubing structure 708 connecting several pump heads 710, 712, 714 and a plurality of fluid cells according to the present invention accommodating various functional elements.

For example, in line 720 a flow cell 722 according to the present invention is provided which accommodates a pH-sensor as a functional element. Further flow cells according to the present invention (not shown) may be incorporated in the tubing arrangement 708 in order to provide a further opportunity to control the quality of the fluid treated, accommodating functional elements like static mixer, conductivity sensors, pressure sensors, capacitive sensors, redox sensors and, if need be, also electrical grounding elements.

Thus, it is apparent from the afore-described complex tubing systems according to the embodiments of FIGS. 7 to 9 that the flow cells according to the present invention may be used in quite different fluid management and/or processing systems so that a tubing arrangement as shown in these Figures may be provided with a plurality of control functions with a small foot print and an easy set-up of the whole system.

All references, including publications, patent applications, and patents, cited herein are hereby incorporated by reference to the same extent as if each reference were individually and specifically indicated to be incorporated by reference and were set forth in its entirety herein describing the invention (especially in the context of the following claims) and are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A tubing arrangement for use in a fluid management and/or processing system, the tubing arrangement comprising first, second, third, and fourth flow cells, each flow cell comprising a functional element and a body having an inlet and an outlet and a fluid flow channel extending from the inlet to the outlet, said body further comprising a receptacle comprising a chamber forming a part of the fluid flow channel, said chamber comprising a first opening for connecting the functional element, wherein the functional element comprises a first conductivity sensor, a pH sensor, a second conductivity sensor, or a pressure sensor, to the flow cell, such that the functional element is in contact with or exposed to a fluid flow passing through the fluid flow channel;
a first tubular connector arranged adjacent to the inlet;
a second tubular connector arranged adjacent to the outlet;
a fluid flow path extending from the first tubular connector through the inlet, the body and the receptacle to the outlet to the second tubular connector, wherein the first flow cell comprises the first conductivity sensor, the second flow cell comprises the pH sensor, the third flow cell comprises the second conductivity sensor, and the fourth flow cell comprises the pressure sensor, wherein the second flow cell comprising the pH sensor is arranged between the first flow cell comprising the first conductivity sensor and the third flow cell comprising the second conductivity sensor, wherein the fourth flow cell is arranged between, and in fluid communication with, the first flow cell and the second flow cell, and
an integrity test line arranged between, and in fluid communication with, the first flow cell and the second flow cell, wherein the fourth flow cell is also in fluid communication with the integrity test line.

2. The tubing arrangement according to claim 1, comprising additional flow cells comprising functional elements selected from a static mixer, a conductivity sensor, an additional pH sensor, an additional pressure sensor, an electrical grounding element, a redox sensing element, a temperature sensor, a capacitive sensor, an optical sensor, a flow sensor, and an element for taking liquid samples.

3. The tubing arrangement according to claim 1, wherein said fluid flow path in each of the first, second, third, and fourth flow cells has a predetermined, essentially consistent cross-sectional area at least within and along the first and second tubular connectors.

4. The tubing arrangement according to claim 3, wherein the volume of the chamber of the body of each of the first, second, third, and fourth flow cells is designed to provide a cross-sectional area of the fluid flow path equal to or larger than the cross-sectional area of the fluid flow path within and along the first and second tubular connectors.

5. The tubing arrangement according to claim 4, wherein a probe end of the functional element comprising the first conductivity sensor, the pH sensor, the second conductivity sensor, or the pressure sensor extending into the chamber is positioned such that the probe end keeps a distance to wall parts of the chamber of about 12 mm or more.

6. The tubing arrangement according to claim 4, wherein the volume of the chamber of the body of each of the first, second, third, and fourth flow cells is designed to provide a cross-sectional area of the fluid flow path equal to or larger than the cross-sectional area of the fluid flow path within and along the first and second tubular connectors, once the functional element is mounted in the opening.

7. The tubing arrangement according to claim 6, wherein once the functional element is mounted in the opening, the functional element extends with a probe end into the chamber.

8. The tubing arrangement according to claim 4, wherein a probe end of the functional element comprising the first conductivity sensor, the pH sensor, the second conductivity sensor or the pressure sensor extending into the chamber is positioned such that the probe end keeps a distance to wall parts of the chamber of about 15 mm or more.

9. The tubing arrangement according claim 1, wherein said tubular connectors are directly attached to the body of each of the first, second, third, and fourth flow cells.

10. The tubing arrangement according to claim 9, wherein the tubular connectors of each of the first, second, third, and fourth flow cells are formed integrally with the body.

11. The tubing arrangement according to claim 1, wherein said body and/or said tubular connectors of each of the first, second, third, and fourth flow cells are made of metal, or a plastics material.

12. The tubing arrangement according to claim 1, wherein the fluid flow channel of each of the first, second, third, and fourth flow cells has a straight configuration; or wherein the fluid flow channel is of an arcuate or curved configuration, or an angled configuration.

13. The tubing arrangement according to claim 12, wherein the fluid flow channel of each of the first, second, third, and fourth flow cells is of a 90 degree angled configuration, or a T-shaped configuration.

14. The tubing arrangement according to claim 1, wherein the chamber of the receptacle of each of the first, second, third, and fourth flow cells has a second opening opposite to the first opening.

15. The tubing arrangement according to claim 14, the second opening provides one of the inlet and the outlet.

16. The tubing arrangement according to claim 1, wherein the chamber of the receptacle of each of the first, second, third, and fourth flow cells has an essentially hollow cylindrical shape.

17. The tubing arrangement according to claim 1, wherein the first opening of the chamber of each of the first, second, third, and fourth flow cells comprises a circular projection extending away from said body to receive said functional element.

18. The tubing arrangement according to claim 1, wherein said first opening of the chamber of each of the first, second, third, and fourth more flow cells accommodates an adapter for positioning one end of the functional element in a predefined position.

19. The tubing arrangement according to claim 1, wherein each of the first, second, third, and fourth flow cells is designed for single use and/or to be sterilized.

20. The tubing arrangement according to claim 1, wherein the cross-sectional area of the fluid flow path of each of the first, second, third, and fourth flow cells along the flow channel corresponds essentially to the cross-sectional area in the first and second tubular connectors.

21. The tubing arrangement according to claim 1, including an inlet port and an inlet line incorporating one of the first, second, and third third, and fourth flow cells.

22. The tubing arrangement according to claim 21, including a pump connected to the inlet line, arranged to provide flow from the inlet port to the tubing arrangement.

23. A fluid management and/or processing system comprising a tubing arrangement comprising first, second, third, and fourth flow cells, each flow cell comprising a functional element and
a body having an inlet and an outlet and a fluid flow channel extending from the inlet to the outlet, said body further comprising a receptacle comprising a chamber forming a part of the fluid flow channel, said chamber comprising a first opening for connecting the functional element, wherein the functional element comprises a first conductivity sensor, a pH sensor, a second conductivity sensor, or a pressure sensor, to the flow cell, such that the functional element is in contact with or exposed to a fluid flow passing through the fluid flow channel;
a first tubular connector arranged adjacent to the inlet;

a second tubular connector arranged adjacent to the outlet;

a fluid flow path extending from the first tubular connector through the inlet, the body and the receptacle to the outlet to the second tubular connector, wherein the first flow cell comprises the first conductivity sensor, the second flow cell comprises the pH sensor, the third flow cell comprises the second conductivity sensor, and the fourth flow cell comprises the pressure sensor, and wherein the second flow cell comprising the pH sensor is arranged between the first flow cell comprising the first conductivity sensor and the third flow cell comprising the second conductivity sensor, wherein the fourth flow cell is arranged between, and in fluid communication with, the first flow cell and the second flow cell, and an integrity test line arranged between, and in fluid communication with, the first flow cell and the second flow cell, wherein the fourth flow cell is also in fluid communication with the integrity test line.

24. The fluid management and/or processing system of claim 23, wherein the system forms a part of a bioprocessing system.

25. The fluid management and/or processing system of claim 23, wherein the tubing arrangement is arranged in a bulk fill manifold.

26. The fluid management and/or processing system of claim 23, wherein the first and second flow cells each have 90 degree angled configuration, or a T-shaped configuration, and the third and fourth flow cells each have a straight configuration.

* * * * *